(12) United States Patent
Quiter et al.

(10) Patent No.: US 10,029,921 B2
(45) Date of Patent: Jul. 24, 2018

(54) METHOD FOR LOWERING THE PRESSURE INSIDE THE HOOD INTERIOR OF A SEPARATOR ARRANGEMENT

(71) Applicant: GEA Mechanical Equipment GmbH, Oelde (DE)

(72) Inventors: Kathrin Quiter, Drensteinfurt (DE); Wilfried Mackel, Lippetal-Herzfeld (DE)

(73) Assignee: GEA Mechanical Equipment GmbH, Oelde (DE)

(*) Notice: Subject to any disclaimer, the term of this patent is extended or adjusted under 35 U.S.C. 154(b) by 692 days.

(21) Appl. No.: 14/416,319

(22) PCT Filed: Jul. 11, 2013

(86) PCT No.: PCT/EP2013/064642
§ 371 (c)(1),
(2) Date: Jan. 22, 2015

(87) PCT Pub. No.: WO2014/016125
PCT Pub. Date: Jan. 30, 2014

(65) Prior Publication Data
US 2015/0175439 A1    Jun. 25, 2015

(30) Foreign Application Priority Data

Jul. 23, 2012 (DE) .......................... 10 2012 106 648

(51) Int. Cl.
*C02F 1/00* (2006.01)
*B04B 1/08* (2006.01)
(Continued)

(52) U.S. Cl.
CPC ............ *C02F 1/001* (2013.01); *B01D 33/067* (2013.01); *B04B 1/08* (2013.01); *B04B 7/02* (2013.01);
(Continued)

(58) Field of Classification Search
CPC .. C02F 1/001; C02F 2301/063; B01D 33/067; B04B 15/08; B04B 1/08; B04B 11/082; B04B 11/06; B04B 7/02
(Continued)

(56) References Cited

U.S. PATENT DOCUMENTS 2,985,361 A * 5/1961 Smith ..................... B04B 15/08
494/38
3,468,475 A * 9/1969 Thylefors ................. B04B 1/08
494/37
(Continued)

FOREIGN PATENT DOCUMENTS

DE    1 178 014 B    9/1964
EP    1 119 416 B1   4/2003
(Continued)

OTHER PUBLICATIONS

International Search Report (PCT/ISA/210) dated Oct. 23, 2013, with English translation (Four (4) pages).
(Continued)

*Primary Examiner* — Walter D Griffin
*Assistant Examiner* — Shuyi S Liu
(74) *Attorney, Agent, or Firm* — Crowell & Moring LLP

(57) ABSTRACT

A method for lowering the pressure inside the hood interior of a separator arrangement with a separator with a rotatable drum includes rotating the rotatable drum about a vertical rotation axis. Before processing a product that is to be processed, a liquid is first directed through the drum and the pressure inside the hood interior is lowered, by a device, as a result of rotations of the drum in the manner of a jet pump. After the pressure inside the hood interior has been lowered sufficiently, then the actual processing of the product that is to be processed is performed.

3 Claims, 4 Drawing Sheets

(51) Int. Cl.
  *B04B 7/02* (2006.01)
  *B04B 11/06* (2006.01)
  *B04B 11/08* (2006.01)
  *B04B 15/08* (2006.01)
  *B01D 33/067* (2006.01)

(52) U.S. Cl.
  CPC ............ *B04B 11/06* (2013.01); *B04B 11/082* (2013.01); *B04B 15/08* (2013.01); *C02F 2301/063* (2013.01)

(58) Field of Classification Search
  USPC ................. 494/1, 4, 9, 38, 39; 210/784, 403
  See application file for complete search history.

(56) References Cited

U.S. PATENT DOCUMENTS

| | | | | |
|---|---|---|---|---|
| 4,081,129 A | * | 3/1978 | Stroucken | B04B 1/14 494/41 |
| 6,530,871 B1 | | 3/2003 | Mackel et al. | |
| 2012/0040816 A1 | * | 2/2012 | Thorwid | B04B 7/02 494/14 |

FOREIGN PATENT DOCUMENTS

| | | | | |
|---|---|---|---|---|
| GB | 919958 | | 2/1963 | |
| GB | 919958 A | * | 2/1963 | ............... B04B 1/08 |

OTHER PUBLICATIONS

German language Written Opinion (PCT/ISA/237) dated Oct. 23, 2013 (Five (5) pages).

\* cited by examiner

METHOD FOR LOWERING THE PRESSURE INSIDE THE HOOD INTERIOR OF A SEPARATOR ARRANGEMENT

BACKGROUND AND SUMMARY OF THE INVENTION

Exemplary embodiments of the invention relate to a separator arrangement.

European patent document EP 1 119 416 B1 discloses a separator arrangement in which a negative pressure is created inside a hood in relation to the environment by means of a pump, as a result of which the energy consumption for rotating the drum can be reduced on account of the reduced friction on the drum outer shell. The generic-type construction and its principle of operation have proved to be successful per se.

Nevertheless, a requirement exists for a simplification of the known separator arrangement and of the method for its operation.

According to exemplary embodiments of the present invention the separator itself has a device for lowering the pressure inside the hood interior as a result of rotations of the drum in the manner of a jet pump. In such way, a separate device for creating the negative pressure can advantageously be dispensed with. The costs for the production of the separator, moreover, are not increased, or only insignificantly increased, as a result of this measure.

Accordingly, a method for lowering the pressure inside the hood interior of a separator arrangement is provided, in which method the pressure inside the hood interior is lowered by means of the device in the manner of a jet pump.

Furthermore, the invention also establishes a method for lowering the pressure inside the hood interior by means of a separator arrangement according to the invention, in which before processing a product a liquid, especially water, is first directed through the drum in order to lower the pressure inside the hood, and after that the actual processing of a product to be processed is started. In such way, no product has to be rejected as result of the lowering of the pressure. It is also conceivable, however, to utilize the product itself for lowering the pressure if it is correspondingly non-reactive. After an emptying process, this procedure can be repeated if necessary.

BRIEF DESCRIPTION OF THE DRAWING FIGURES

The invention is described in more detail below based on an exemplary embodiment with reference to the drawing. In the drawing.

DETAILED DESCRIPTION

Figure 1:
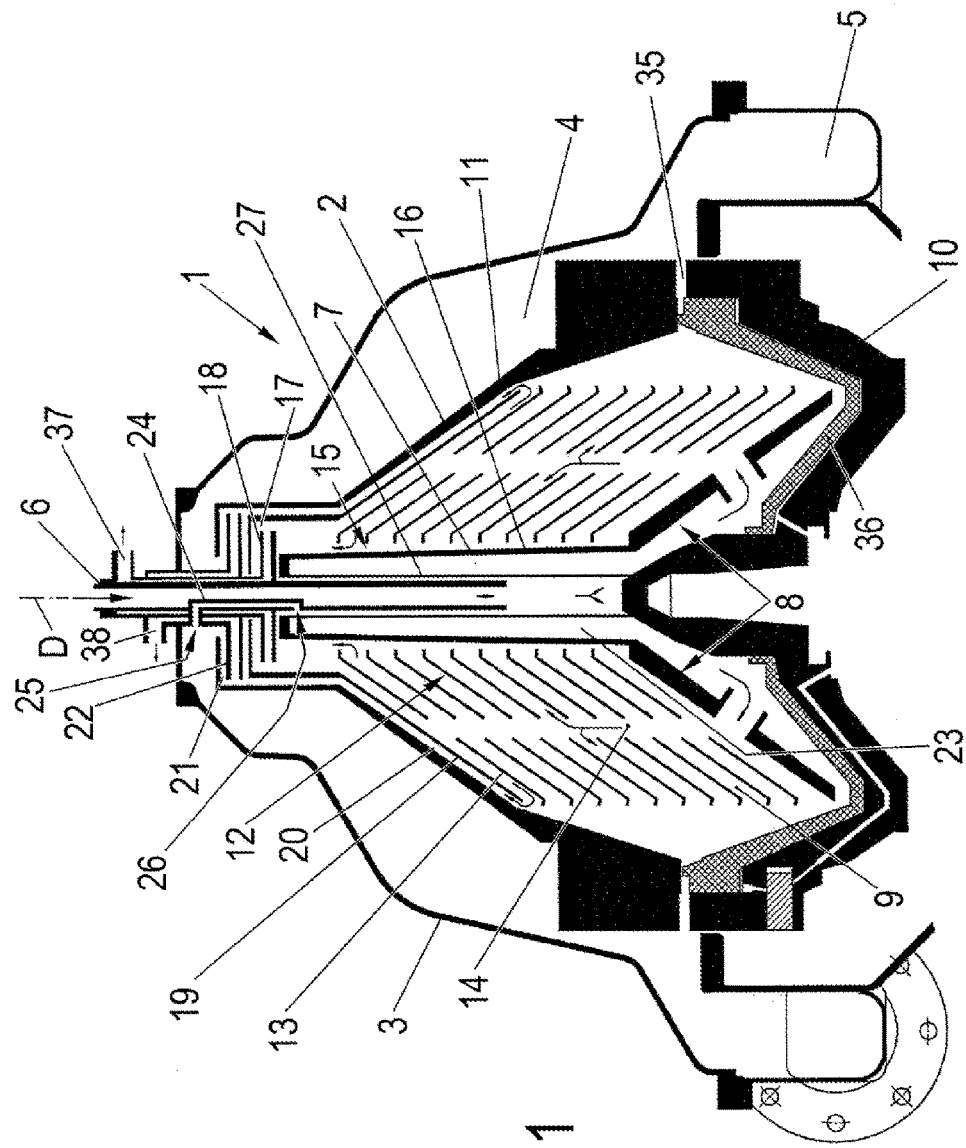
FIG. 1 shows a schematic section-like representation of a first separator arrangement.

FIG. 1 shows a separator arrangement 1 with a separator having a rotatable drum 2, with a vertical rotational axis D, which can preferably be mounted on a drive spindle (not shown here).

The drum 2 is enclosed by a hood 3, which does not rotate during operation and is preferably connected in its lower region to a machine frame in such a way that a hood interior 4, which is sealed in relation to the exterior of the hood 3, is formed inside the hood 3 between the hood 3 and the drum 2. The hood 3 in this case also has a solid-material catcher 5 for catching solid materials which discharge from the drum.

The drum 2 is mounted on a drive spindle, which is not shown here, and is coupled to this in a rotation-resistant manner, wherein the drive spindle can in turn be rotated by means of a motor, which is not shown here.

A feed pipe 6 is provided to feed the product into the drum 2, the feed pipe 6 in this case extends from the top into the drum 2 and during operation does not rotate with the drum 2 but is stationary. This is the preferred embodiment, although within the scope of the invention constructions in which the product feed is carried out from the bottom into the drum 2 (not shown here) can also be realized.

At its lower end, the feed pipe 6 opens into a distributor 7 having distribution channels 8 for introducing a product to be processed into the drum interior 9.

The drum 2 preferably has a single conical or preferably a double conical shape with a lower part 10 and an upper part 11. A separating plate packet 12 consisting of axially spaced apart separating plates 13 is preferably arranged in the drum interior, wherein one or more riser channels 14 are formed inside the separating plate packet 12 in this case. This, however, is not compulsory within the scope of the invention.

The separator arrangement shown in FIG. 1 enables separation and preferably also clarification of a product to be processed into three phases: a lighter liquid phase, a heavier liquid phase, and a solid material phase. This embodiment is advantageous but not compulsory. Separators according to the invention can also be designed or be operated as pure separating devices for liquid/liquid separation or as clarifying devices for solid/liquid separation. In the last case, only one paring disk (not shown here) would be required for discharging the only one liquid phase.

The lighter liquid phase flows radially inward inside the separating plate packet and then, in one or more discharge channels 15 on a distribution shaft 16, flows upward and is finally directed into a first paring chamber 17, and from there is directed through a first paring disk (stationary during operation) 18 (in the manner of a centripetal pump) and out of the drum 2 through a discharge pipe 37.

In contrast to this, the heavier liquid phase flows together with the solid materials radially outward inside the separating plate packet 12, flows there via the radially outer edge of a separating plate 19 above the plate packet 12 and is directed there through a further discharge channel 20 into a second paring chamber 21 and from there is directed through a second paring disk (stationary during operation) 22 (again in the manner of a centripetal pump) and out of the drum 2 through a discharge pipe 38.

Solid materials are ejected through discharge openings 35, which can be closed off by a hydraulically operable piston slide valve 36. However, a drum with nozzles for the continuous discharge of solid material or a drum without discharge of solid material, if such is not required (liquid/liquid separation), would also be conceivable.

Formed in the distributor shaft 16 is a distribution chamber 23 (for example a bore) from which branch the distribution channels 8.

The lower section of the feed pipe 6 projects moreover into the distribution chamber 23, wherein a circumferential gap 27 is formed between the non-rotating feed pipe 6 and the distribution chamber 14. In the bore of the distribution chamber 23, fins or finned bodies can also be formed on the outside and vertically can cover at least sections of the foot and can extend radially to the circumferential gap 23 of the inlet pipe. Beneath the inlet pipe, the fins can also be formed right up to the rotational axis.

In order to create a vacuum in the interior of the hood 4 between drum 2 and hood 3 during operation, the separator itself has a device 24 for lowering the pressure inside the hood interior as a result of rotations of the drum in the manner of a jet pump.

This device 24, according to FIG. 1, in a preferred embodiment, is designed as a fluid connection—in this case a fluid pipe 24—between the hood interior 4 and the distribution chamber 23. This, in a simple way in this case, is realized by the fluid pipe 24 being designed as a separate pipe inside the feed pipe 6 which has no connection to the feed pipe or is fluidically completely separated from this, wherein an inlet opening 25 into the fluid pipe 24 is preferably formed as a radial opening 25 in the feed pipe 6 above the two paring disks 18, 22 and above the rotatable drum 2. From the opening 25, the fluid pipe 24 inside the feed pipe 6 extends through this axially into the distributor shaft 16 where an outlet 26 into the distribution chamber 23 is formed.

In such way, the required fluid channel or a fluid connection between the hood interior 4 and the distribution chamber 23 can be realized in a simple manner. During operation, if liquid is directed into the drum, this fluid channel acts in the manner of a jet pump so that air/gas is transported out of the hood interior 4 through the fluid pipe 24 into the distribution chamber 23, from where the air or the gas is discharged with the liquid (or product) through the drum 2 and its outlet or its outlets (the paring disks in this case).

Figure 3:
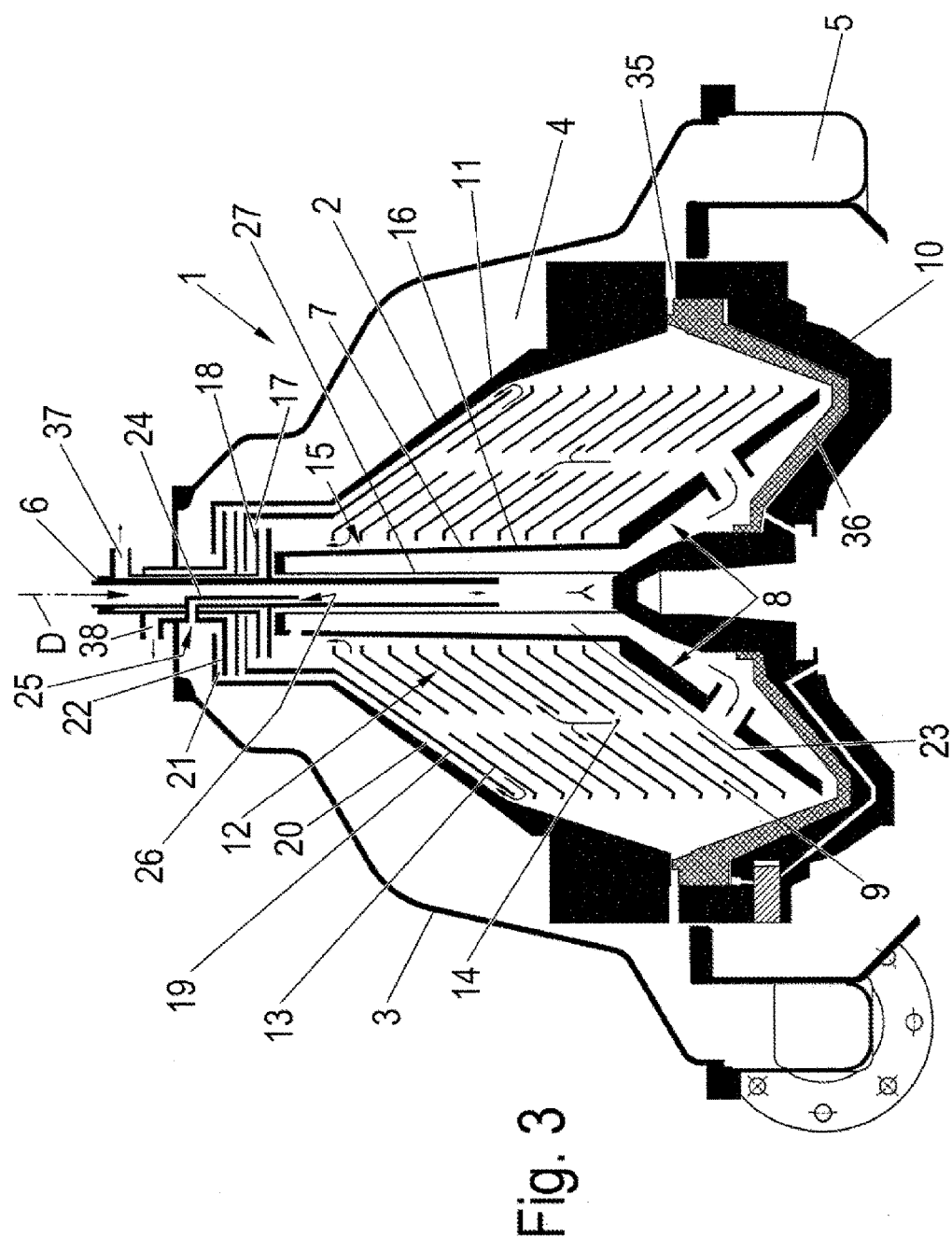
FIG. 3 shows a schematic section-like representation of a third separator arrangement.

The jet pump effect is also provided if the fluid pipe 24 extends a little in a parallel manner inside the feed pipe and then terminates in this in an open state (see FIG. 3). The fluid pipe 24 is then not guided outward (with regard to the inlet pipe) at the end 26 but terminates in the feed pipe at the end 26 in an open state. The opening then only has to lie in the flow direction of the feed. In this case, the pipe would possibly be extended further downward, but it can also be shorter as in FIG. 1.

It is particularly advantageous if, during operation, before the processing of a product a neutral liquid such as water is first directed through the drum 2 in order to sufficiently lower the pressure inside the hood 3, for example by 0.3 bar or more. Then, if the pressure inside the hood is lowered sufficiently, the actual processing of the product can be carried out. If the introduction of gas is not interrupted during the product processing, even the product itself can be utilized as the transporting medium or the liquid.

A pressure reduction inside hood 3 can indeed be realized just by means of the described measure, by means of which the friction on the outer shell of the drum 2 and therefore the energy consumption are significantly reduced. However, it is conceivable to use a corresponding "vacuum generating" pump in a supporting manner in order to lower the pressure inside the hood 3 still further (not shown here).

A measuring device (not shown) preferably enables the monitoring of the pressure inside the hood interior 4.

It is to be stressed that it is not necessary with the described measure to hermetically seal the drum 2 against the hood interior 4, and thus the cost of a corresponding hermetic design can be dispensed with.

Figure 2:
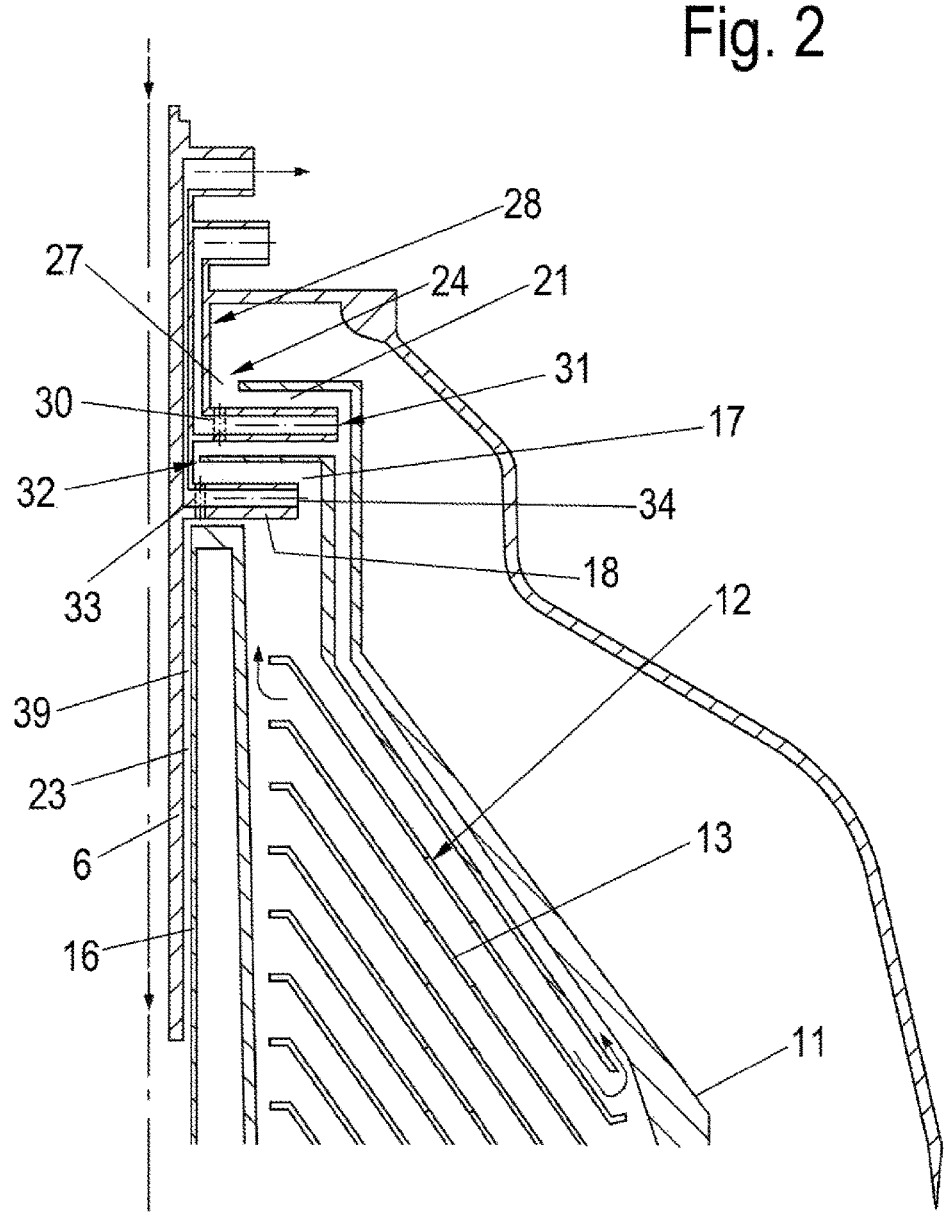
FIG. 2 shows a schematic section-like representation of a section of a second separator arrangement.

According to the variant of FIG. 2, the fluid channel connection 24 is realized in another way.

The fluid connection 24 is formed in this case in a simple manner by the following features:
- a circumferential gap 27 between the drum upper section and a paring disk shaft 28,
- a first bore 30 (indicated by dashed lines) through the upper paring disk 22 to the side of the actual paring disk channel 31,
- a circumferential gap 32 between the first and the second paring chambers (17, 21),
- a second bore 33 (indicated by dashed lines) through the lower paring disk 18 to the side of the actual paring disk channel 34, and
- the gap 39 between the feed pipe 6 and the distributor shaft 16. This variant would also be conceivable for a drum with only one gripper with a bore in only the one gripper.

The principle of operation of the exemplary embodiment of FIG. 2 corresponds in principle to that of FIG. 1. In the case of this variant, the gas is transported out of the hood interior 4, through the bores 30/33, the distribution chamber 23, the distribution channels 8, the drum and the paring disks 18, 22 and out of the rotating system. With this, the drum is not of a hermetically closed design either as in the case this variant as in the case of FIG. 1.

The fluid connection can also be realized in yet another way. The variant of FIG. 2 can be realized, however, in a particularly inexpensive manner since it requires only two bores in the paring disks and otherwise requires no additional construction measures on the separator.

It is advantageous if a (absolute) negative pressure of less than 0.7 bar, preferably less than 0.6 bar, especially less than 0.5 bar, is created.

Figure 4:
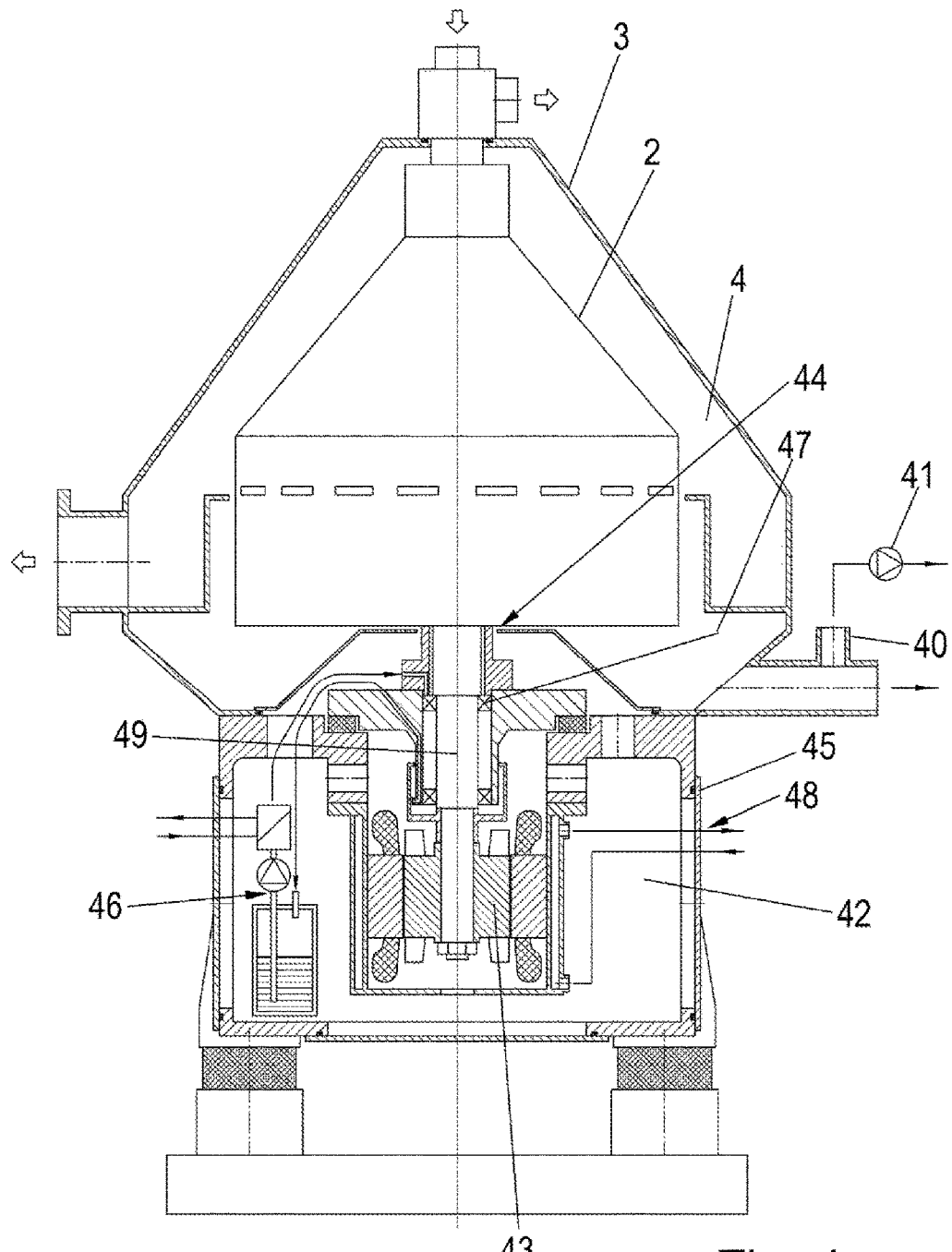
FIG. 4 shows a schematic representation of a separator arrangement according to the invention with a drive chamber shown in section.

According to FIG. 4, in the case of a drum especially in the style of FIG. 1 or 2—not shown in more detail here—a pump 41 (or another device for lowering the pressure inside the hood interior 4 in relation to the environment), in addition to a negative pressure connection 40, is also additionally connected to the hood interior 4 by means of which a negative pressure can additionally be created inside the hood interior 4 in relation to the environment U outside the hood interior 4.

If the drive chamber 42 for the drive motor 43 beneath the drum in the case of a design as a direct drive is to be integrated into the negative pressure region of the hood interior similar to FIG. 4, then this can be realized in a particularly simple manner by the creation of an open connection 44 of the two chambers. It is particularly advantageous in this case to locate the connection close to the rotational axis. It would also be conceivable to close off the connection 44 and, instead, to lower the pressure in the drive chamber by means of a pump or the like (not shown).

The drive chamber 42 is delimited here by a drive housing 45 which, in accordance with the task of also creating a negative pressure in the drive chamber 42 in relation to the environment U, is again designed in a correspondingly sealed type of construction, apart from the connection 44. To this end, according to FIG. 4 suitable seals are again formed between elements of the drive housing.

Also arranged in the drive chamber 42 is a lubricating system 46 which serves for lubricating the bearings 47 of the spindle 49 and/or for lubricating components on the motor.

Discharge- and feed lines 48 from one or more cooling medium circuits also open into the drive chamber 42 in this case, here in one case for the motor and in one case for the lubricating system.

It is understood that for creating a vacuum according to FIGS. 1 to 4 the region to be evacuated in each case is correspondingly to be sealed against the environment (especially the hood, the solid material catcher (if present) and possibly the drive frame or other regions which delimit the space surrounding the drum).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| List of designations | |
|---|---|
| Separator arrangement | 1 |
| Drum | 2 |
| Hood | 3 |
| Hood interior | 4 |
| Solid-material catcher | 5 |
| Feed pipe | 6 |
| Distributor | 7 |
| Distribution channels | 8 |
| Drum interior | 9 |
| Drum lower part | 10 |
| Drum upper part | 11 |
| Separating plate packet | 12 |
| Separating plates | 13 |
| Riser channels | 14 |
| Discharge channel | 15 |
| Distributor shaft | 16 |
| Paring chamber | 17 |
| Paring disk | 18 |
| Separating plate | 19 |
| Discharge channel | 20 |
| Paring chamber | 21 |
| Paring disk | 22 |
| Distribution chamber | 23 |
| Liquid connection | 24 |
| Inlet | 25 |
| Outlet | 26 |
| Circumferential gap | 27 |
| Paring disk shaft | 28 |
| A first bore | 30 |
| Paring disk channel | 31 |

| List of designations -continued | |
|---|---|
| Circumferential gap | 32 |
| Second bore | 33 |
| Paring disk channel | 34 |
| Solid-material discharge openings | 35 |
| Piston slide valve | 36 |
| Discharge pipe | 37 |
| Discharge pipe | 38 |
| Gap | 39 |
| Negative pressure connection | 40 |
| Pump | 41 |
| Drive chamber | 42 |
| Drive motor | 43 |
| Connection | 44 |
| Drive housing | 45 |
| Lubricating system | 46 |
| Spindle bearings | 47 |
| Discharge- and feed lines | 48 |
| Spindle | 49 |

The invention claimed is:

1. A method for lowering the pressure inside the hood interior of a separator arrangement with a separator with a rotatable drum, with a vertical rotational axis; a distributor including a distribution chamber; a feed pipe projecting into the distribution chamber of the distributor; and a non-rotatable hood enclosing the rotatable drum, wherein a hood interior, which is sealed against the exterior region of the hood is formed between the hood and the drum, wherein the drum, in an inlet region, is not hermetically sealed against the hood interior, the method comprising:
    rotating the rotatable drum about the vertical rotation axis;
    before processing a product that is to be processed, first directing a liquid through the drum and lowering, by a device, pressure inside the hood interior as a result of rotations of the drum in the manner of a jet pump; and
    after the pressure inside the hood interior has been lowered sufficiently, then the actual processing of the product that is to be processed is performed.

2. The method of claim 1, wherein the liquid is the product itself.

3. The method of claim 1, wherein the liquid is water.

* * * * *